Patented June 30, 1931

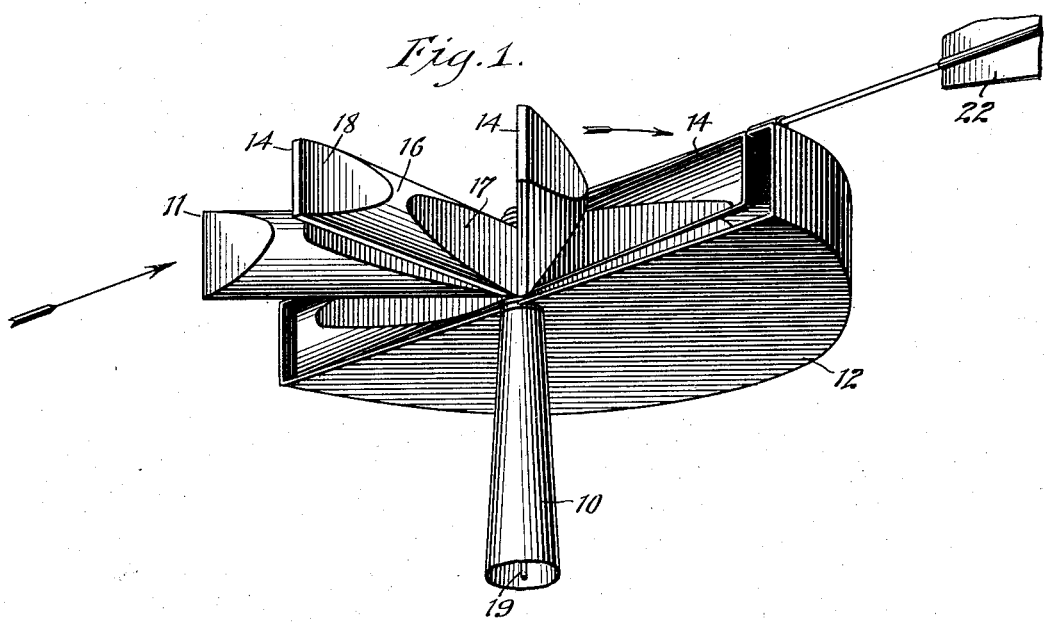
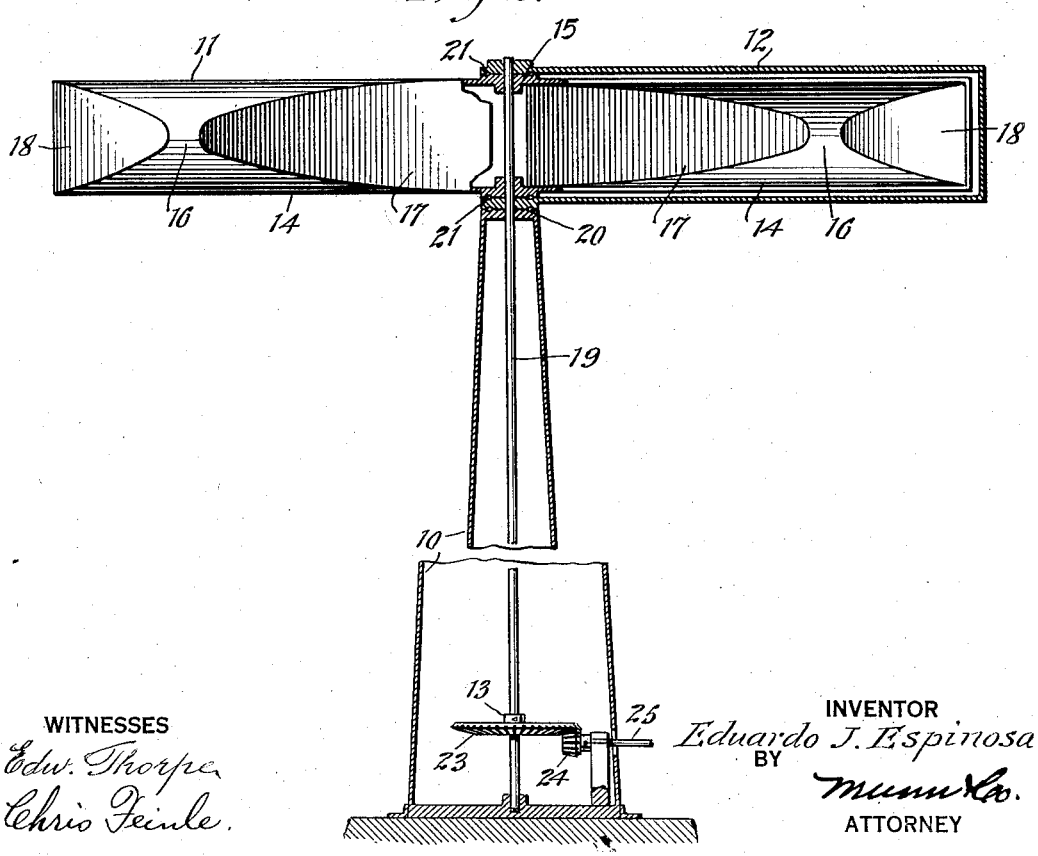

1,812,741

UNITED STATES PATENT OFFICE

EDUARDO JIMÉNEZ ESPINOSA, OF SANTIAGO, CUBA

WINDMILL

Application filed January 31, 1930. Serial No. 424,881.

This invention relates to a windmill or air motor designed and adapted to furnish motive power for operating all kinds of machinery and motion transmitting mechanisms.

The principal object of the invention is the provision of a device of the indicated character which embodies improvements to increase the aerodynamic efficiency thereof by eliminating all unnecessary resistance which would tend to retard the operation of the device.

The nature of the invention and its distinguishing features and advantages will appear when the following specification is read in conjunction with the accompanying drawings, in which Figure 1 is a perspective view showing the upper end of the tower, the wind wheel and the windshield associated with the latter.

Figure 2 is a vertical section, a portion of the tower of the device being broken away.

The device of the present invention, generally stated, comprises a supporting structure, tower or mast 10, a wind wheel 11, a windshield 12 for the wind wheel, and motion transmitting means 13 operatively connected with the wind wheel 11.

The wind wheel 11 consists of a plurality of radial vanes 14 which are connected at their inner ends with hubs 15. Each of the vanes 14 is of dished formation, the same being concaved in cross section near its outer end as at 16, and having flat sections 17 and 18 which merge with the concaved section 16. It will therefore be apparent that the construction of each vane 14 is such that air will be trapped thereby, and this air will slide from the inner end of a vane toward the outer extremity thereof and thus act as a lever for effecting turning movement of the wind wheel. The wind wheel 11 is secured to a vertical shaft 19 mounted for rotation in the tower 10. In the present instance the tower 10 is of such construction as to enclose the shaft 19.

The windshield 12 is of hollow construction and is mounted for turning movement around the upper end of the shaft 19. The said windshield 12 turns on suitable antifriction balls 20 on the upper end of the tower 10. The windshield 12 is adapted to receive substantially one-half of the wind wheel 11 to enclose the same. The wind wheel 11 rotates anti-friction balls 21 arranged between the hubs 15 of the wind wheel and portions of the windshield 12. The windshield 12 carries a vertical rudder 22, the latter being disposed parallel with the edges of the windshield 12, binding the side opening thereof. The rudder 22 in the present instance projects laterally a suitable distance from the windshield 12. This rudder serves for the purpose of moving the windshield to a position to always cover that one-half of the wind wheel 11 which would be retarded by the force of the wind. The rudder 22 will be acted upon by the air stream and will always hold the windshield 12 in the proper position, it being understood that the windshield 12 is free to turn around the shaft 19 at all times.

It will be apparent that as each vane 14 of the wind-wheel leaves the windshield its surface 18 will deflect the air stream into the next preceding vane 14, thus insuring rotation of the wind-wheel in the proper direction, regardless of the position into which the windshield is moved by the rudder 22.

The transmitting means 13 hereinbefore referred to includes the shaft 19, and also includes a beveled gear 23 secured to the shaft 19 and a beveled pinion 24 which meshes with the gear 23, the pinion 24 being secured to a shaft 25. The shaft 25 may be connected with any kind of machine for the purpose of operating the same.

From the foregoing it will be apparent that only one-half of the wind wheel 11 will be exposed to the force of the wind to turn the wind wheel, and that by reason of the provision of the windshield 12 all unnecessary resistance which would retard the rotation of the wind wheel 11 will be eliminated, thereby increasing the aerodynamic efficiency of the device.

I claim:

In a windmill, the combination of a windwheel mounted for rotation, said windwheel consisting of radially disposed vanes, each of said vanes being of dished construction closed at one side and fully open at the opposite side, and providing an outer and deflecting surface, a hollow windshield mounted to turn with respect to said windwheel and adapted to enclose substantially one-half of the upper and lower parts of said wind-wheel, and a rudder on said windshield to turn the latter in response to the pressure of the wind on said rudder.

EDUARDO JIMÉNEZ ESPINOSA.